US011423650B2

(12) United States Patent
Li (10) Patent No.: US 11,423,650 B2
(45) Date of Patent: Aug. 23, 2022

(54) VISUAL POSITIONING METHOD AND APPARATUS, AND COMPUTER-READABLE STORAGE MEDIUM (71) Applicant: BEIJING BAIDU NETCOM SCIENCE AND TECHNOLOGY CO., LTD., Beijing (CN)

(72) Inventor: Zhaohu Li, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 78 days.

(21) Appl. No.: 17/248,898

(22) Filed: Feb. 12, 2021

(65) Prior Publication Data
US 2021/0264155 A1  Aug. 26, 2021

(30) Foreign Application Priority Data
Feb. 25, 2020  (CN) .......................... 202010118570.6

(51) Int. Cl.
G06V 10/00  (2022.01)
G06V 20/00  (2022.01)
(Continued)

(52) U.S. Cl.
CPC .......... *G06V 20/35* (2022.01); *G06K 9/6296* (2013.01); *G06T 5/50* (2013.01); *G06T 7/11* (2017.01);
(Continued)

(58) Field of Classification Search
CPC . G06T 7/11; G06T 7/162; G06T 2207/20072; G06V 10/426; G06V 10/44;
(Continued)

(56) References Cited

U.S. PATENT DOCUMENTS 11,367,184 B2 * 6/2022 Tosun .................... G06V 10/40
2004/0086185 A1 * 5/2004 Sun ...................... G06K 9/6224
382/224

(Continued)

OTHER PUBLICATIONS

P. Dickinson, G. Cielniak, O. Szymanezyk and M. Mannion, "Indoor positioning of shoppers using a network of Bluetooth Low Energy beacons," 2016 International Conference on Indoor Positioning and Indoor Navigation (IPIN), 2016, pp. 1-8, doi: 10.1109/IPIN.2016.7743684. (Year: 2016).*

(Continued)

Primary Examiner — Li Liu
(74) Attorney, Agent, or Firm — Fay Sharpe LLP (57) ABSTRACT The disclosure provides a visual positioning method and apparatus, an electronic device and a computer-readable storage medium. The method includes: generating a semantic graph by semantically identifying collected images; determining description information of each entity through a random walk algorithm in the established semantic graph; determining candidate entities matching each entity in a preset entity map based on the description information; and positioning a collection area of the current image based on an area where the candidate entities are located in the preset entity map. The description information of each entity node constructed with the random walk algorithm not only contains semantic information of the corresponding node, but also local constraint information between semantics.

19 Claims, 6 Drawing Sheets (51) Int. Cl.
    *G06T 7/11*         (2017.01)
    *G06K 9/62*        (2022.01)
    *G06T 5/50*        (2006.01)
    *G06V 10/44*      (2022.01)
    *G06V 20/20*      (2022.01)
    *G06V 20/30*      (2022.01)

(52) U.S. Cl.
    CPC ............ *G06V 10/443* (2022.01); *G06V 20/20* (2022.01); *G06V 20/30* (2022.01)

(58) Field of Classification Search
    CPC .. G06V 10/25; G06V 10/443; G06V 30/1988; G06K 9/6224
    See application file for complete search history.

(56) References Cited

U.S. PATENT DOCUMENTS

2011/0082670 A1*   4/2011   McAuley ................ G06F 17/10
                                                                 703/2
2017/0200293 A1*   7/2017   Solem ................... G06T 11/206

OTHER PUBLICATIONS

M. Koivisto, H. Nurminen, S. Ali-Loytty and R. Piche, "Graph-based map matching for indoor positioning," 2015 10th International Conference on Information, Communications and Signal Processing (ICICS), 2015, pp. 1-5, doi: 10.1109/ICICS.2015.7459983. (Year: 2015).*

* cited by examiner

VISUAL POSITIONING METHOD AND APPARATUS, AND COMPUTER-READABLE STORAGE MEDIUM

CROSS-REFERENCE TO RELATED APPLICATION

The present application is based upon and claims priority to Chinese Patent Application No. 202010118570.6, filed on Feb. 25, 2020, the entirety contents of which are incorporated herein by reference.

TECHNICAL FIELD

The disclosure relates to fields of computer vision and image processing technologies, and more particularly, to a visual positioning method, a visual positioning apparatus and a computer-readable storage medium.

BACKGROUND

The visual positioning technology is a core of fields such as the Virtual Reality (VR), the Augmented Reality (AR), and the unmanned driving, where subsequent complex processing could be completed only under the premise of accurate positioning.

Currently, a general technical solution for indoor/outdoor positioning is adopted where image retrieval technologies are first configured for coarse positioning, and a precise matching is performed based on the coarse positioning to determine an image location.

SUMMARY

In a first aspect, embodiments of the disclosure provide a visual positioning method. The method includes: collecting a first image; identifying the first image to determine entity types for a plurality of first entities presented in the first image and a distance between every two first entities; generating a first graph based on the distance between every two first entities, in which the first graph includes nodes corresponding to the plurality of first entities and edges for connecting different nodes in the first graph, the node is configured to indicate the entity type for the corresponding first entity, and the edge is configured to indicate that a distance between two first entities corresponding to two connected nodes is less than a threshold distance; determining description information of the first entity corresponding to each node in the first graph based on the entity types indicated by nodes that are in random walk paths starting from the corresponding node; determining a candidate entity for each first entity from a plurality of second entities based on pre-stored description information for the plurality of second entities, in which the description information of the candidate entity for the first entity matches the description information of the first entity, the description information of each second entity is configured to indicate entity types for second entities adjacent to the corresponding second entity; and positioning a collection area of the first image based on an area where the candidate entities are located.

In a second aspect, embodiments of the disclosure provide a visual positioning apparatus. The apparatus includes at least one processor and a memory communicatively coupled to the at least one processor. The at least one processor may be configured to collect a first image. The at least one processor may be configured to identify the first image to determine entity types for a plurality of first entities presented in the first image and a distance between every two first entities The at least one processor may be configured to generate a first graph based on the distance between every two first entities, in which the first graph includes nodes corresponding to the plurality of first entities and edges for connecting different nodes in the first graph, the node is configured to indicate the entity type for the corresponding first entity, and the edge is configured to indicate that a distance between two first entities corresponding to two connected nodes is less than a threshold distance. The at least one processor may be configured to determine description information of the first entity corresponding to each node in the first graph based on the entity types indicated by nodes that are in random walk paths starting from the corresponding node. The at least one processor may be configured to determine a candidate entity for each first entity from a plurality of second entities based on pre-stored description information for the plurality of second entities, in which the description information of the candidate entity for the first entity matches the description information of the first entity, the description information of each second entity is configured to indicate entity types for second entities adjacent to the corresponding second entity. The at least one processor may be configured to position a collection area of the first image based on an area where the candidate entities are located.

In a third aspect, embodiments of the disclosure provide a non-transitory computer-readable storage medium having computer programs stored thereon, when the programs are executed by a processor, the visual positioning method according to the first aspect is implemented.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

The above and/or additional aspects and advantages of embodiments of the disclosure will become apparent and more readily appreciated from the following descriptions in conjunction with the drawings, in which.

DETAILED DESCRIPTION

Embodiments of the disclosure will be described In particular and examples of the embodiments are illustrated in the drawings, in which the same or similar reference numerals indicate the same or similar elements or the elements having the same or similar functions. Embodiments described herein with reference to drawings are illustrative to explain the disclosure, and are not construed to limit the disclosure.

Currently, a general technical solution for indoor/outdoor positioning is adopted where image retrieval technologies are first configured for coarse positioning, and a precise matching is performed based on the coarse positioning to determine an image location. However, the current image retrieval technologies have poor performance in positioning the scenes for a long time with significant changes in perspectives and illuminations, especially the scenes with many indoor dynamic objects and serious repetitive textures. The existing technical solution with a Convolutional Neural Network (CNN)-based image retrieval often generates wrong coarse positioning results, precise locations could not be thus obtained thereafter, thereby leading to poor positioning accuracy and robustness.

Therefore, embodiments of the disclosure provide a visual positioning method and a visual positioning apparatus.

A visual positioning method, a visual positioning apparatus and a computer-readable storage medium according to the embodiments of the disclosure are described below with reference to the accompanying drawings.

Figure 1:
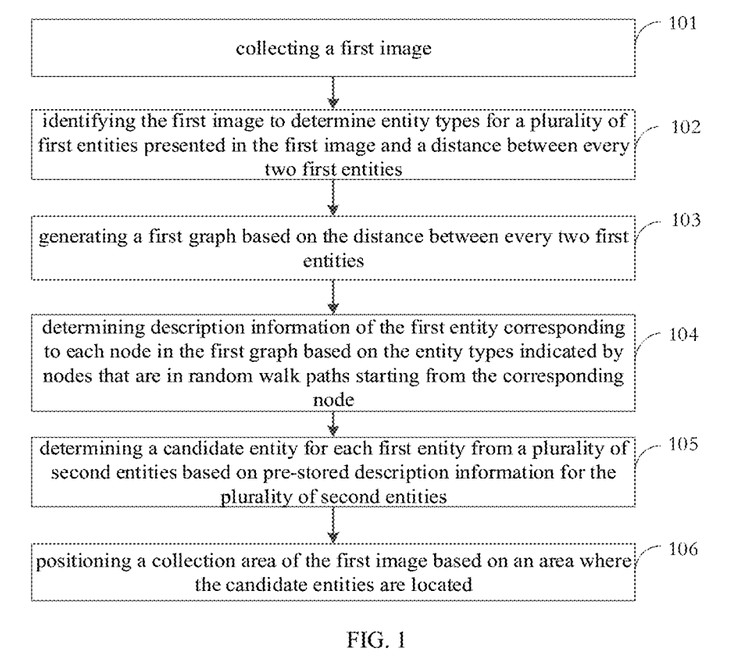
FIG. 1 is a schematic flowchart of a visual positioning method according to embodiments of the disclosure.

FIG. 1 is a schematic flowchart of a visual positioning method according to embodiments of the disclosure.

As illustrated in FIG. 1, the method includes the following steps.

At block 101, a first image is collected.

The first image may be collected in real time through cameras, or obtained from a preset image library. The first image may be one image or a plurality of images.

The first image in this embodiment is an image for visual positioning.

At block 102, the first image is identified to determine entity types for a plurality of first entities presented in the first image and a distance between every two first entities.

The entities refer to physical or virtual objects included in an image, such as people, objects, or geographic names.

Figure 2:
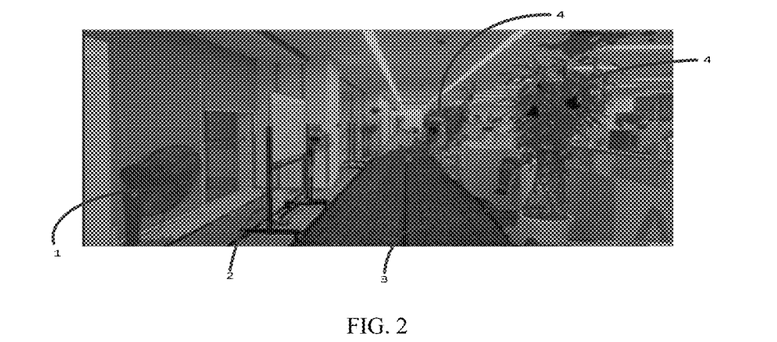
FIG. 2 is a diagram of a semantic segmented first image according to embodiments of the disclosure.

In particular, semantic segmentation is performed on the first image. As a possible implementation, semantic segmentation is performed based on deep learning to obtain a plurality of semantic blocks, and a center of each semantic block is determined. The first entity presented in each semantic block of the semantic segmented image and the entity type for the first entity are identified by using the pixels in the image as a unit threshold. The entity type is configured to indicate the type or category for the entity. As illustrated in FIG. 2, each entity corresponding to different semantics are obtained after performing semantic segmentation on the first image, and the entity types corresponding to the entities are determined. The entity type is numbered correspondingly, and each number corresponds to an entity. The same entity is indicated with the same number. For example, the entity type indicated with 4 in FIG. 2 is a potted plant, the entity type indicated with 3 is a carpet, the entity type indicated with 2 is a blackboard, and the entity type indicated with 1 is an electric fan. In FIG. 2, there are a plurality of potted plants, each of which corresponds to the same entity type, that is, the entity type indicated with 4 is the potted plant.

Meanwhile, it is also necessary to determine the distances between any two first entities. In particular, after performing semantic segmentation on the first image, a plurality of first entities are identified. For two first entities presented in the first image with a same frame, the distance between the two first entities is determined based on a distance between the centers of two corresponding semantic segmented image areas.

It should be noted that the distances in this embodiment are all distances in physical world coordinate system.

It should be understood that the semantic identification of entities in FIG. 2 is only for illustration, and more entities may be identified in practical applications, which is not limited in the embodiment.

At block 103, a first graph is generated based on the distance between every two first entities.

The first graph includes nodes corresponding to the plurality of first entities and edges for connecting different nodes in the first graph, the node is configured to indicate the entity type for the corresponding first entity, and the edge is configured to indicate that a distance between two first entities corresponding to two connected nodes is less than a threshold distance.

In particular, the distances between different entities obtained by performing semantic identification on the image are different. When the distance between two first entities corresponding to two connected nodes is less than the threshold distance, the two first entities are connected by an edge to generate the first graph. When the distance between two first entities is less than the threshold distance, that is, the distance between the two first entities is small, the other first entity that is close to one of the two first entities may be observed when collecting the first entity. In other words, the first image collected includes two entities that are close to each other, which means that the two first entities are semantically correlated. The correlation relation between the two first entities is represented through the semantic graph, so as to reflect the semantic constraint relation between the entities.

Figure 3:
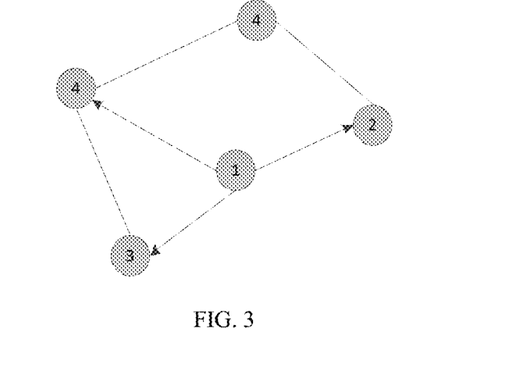
FIG. 3 is a schematic diagram of a first graph according to embodiments of the disclosure.

FIG. 3 is a schematic diagram of a first graph according to embodiments of the disclosure. As illustrated in FIG. 3, the first graph is generated according to the first image corresponding to FIG. 2, and all nodes in the first graph are the nodes corresponding to the entities obtained by performing identification on the first image. As illustrated in FIG. 3, each solid point in the first graph represents a node, which corresponds to the entity obtained by performing semantic identification in FIG. 2, and each node indicates the entity type for the corresponding first entity. For example, the node numbered 4 indicates that its entity type is a potted plant, and the node numbered 1 indicates that its entity type is an electric fan, which is not listed here.

At block 104, description information of the first entity corresponding to each node in the first graph is determined based on the entity types indicated by nodes that are in random walk paths starting from the corresponding node.

As illustrated in FIG. 3, different entity types are numbered with different numbers. For example, the entity types are numbered with numbers 1-N in a sequential order, where N is a natural number. Furthermore, the node corresponding to each first entity is represented by the number corresponding to the entity type. For example, the node 1 indicates that the entity type number corresponding to the node is 1. As illustrated in FIG. 3, taking the first entity corresponding to the node 1 as an example, the entity type indicated by each node in the path 1 represented with arrows is walked starting from the node 1 with the random walk algorithm, and two dimensions of representation (1, 2) are obtained. The node 1 is a starting point, and other paths may also be walked to obtain two dimensions of representation (1, 4) or two dimensions of representation (1, 3). Therefore, based on the path corresponding to each node, the description information of the first entity corresponding to each node is expressed as N*M, where N is the path corresponding to each node, and M is a number of nodes included in each path, that is, a dimension of the entity type. The description information of the first entity is obtained by walking through the entity type indicated by each node in the random walk path, so that the description information of each first entity corresponding to one node not only contains the semantic information (i.e., the semantic type) of the first entity corresponding to this node, but also contains the semantic constraint information between the first entity corresponding to this node and the first entities corresponding to other different nodes, which improves accuracy and robustness of image visual positioning.

It should be noted that when there are a plurality of first images to be positioned, the corresponding graphs are determined in sequence according to the above method, and the method for determining the description information of each entity with the random walk algorithm is the same as the method for determining the description information of each entity in the graph in FIG. 3, which is not repeated herein.

At block 105, a candidate entity for each first entity is determined from a plurality of second entities based on pre-stored description information for the plurality of second entities.

The description information of each second entity is configured to indicate the entity type for each second entity that is adjacent to the corresponding second entity.

In particular, by matching the description information of each first entity with the pre-stored description information for the plurality of second entities, the second entity having a largest matching degree with each first entity is determined as the candidate entity corresponding to each first entity.

The method for determining the pre-stored description information for the plurality of second entities is described in detail in the following embodiments, which is not repeated herein.

At block 106, a collection area of the first image is positioned based on an area where the candidate entities are located.

In particular, since the collection area of each second entity is predetermined, the collection area of the first image is positioned based on the determined areas where the candidate entities corresponding to the first entities are located, which improves robustness and accuracy of visually positioning the first image.

In the method of the embodiments of the disclosure, a first image is collected, the first image is identified to determine entity types for a plurality of first entities presented in the first image and a distance between every two first entities. A first graph is generated based on the distance between every two first entities. Description information of the first entity corresponding to each node in the first graph is determined based on the entity types indicated by nodes that are in random walk paths starting from the corresponding node. A candidate entity for each first entity is determined from a plurality of second entities based on pre-stored description information for the plurality of second entities. A collection area of the first image is positioned based on an area where the candidate entities are located. The description information of each entity node is constructed based on the generated semantic graph with the random walk algorithm, so that the description information not only contains the semantic information of the corresponding node, but also local constraint information between semantics, which improves robustness, accuracy and stability of visual positioning for the collected images.

Figure 4:
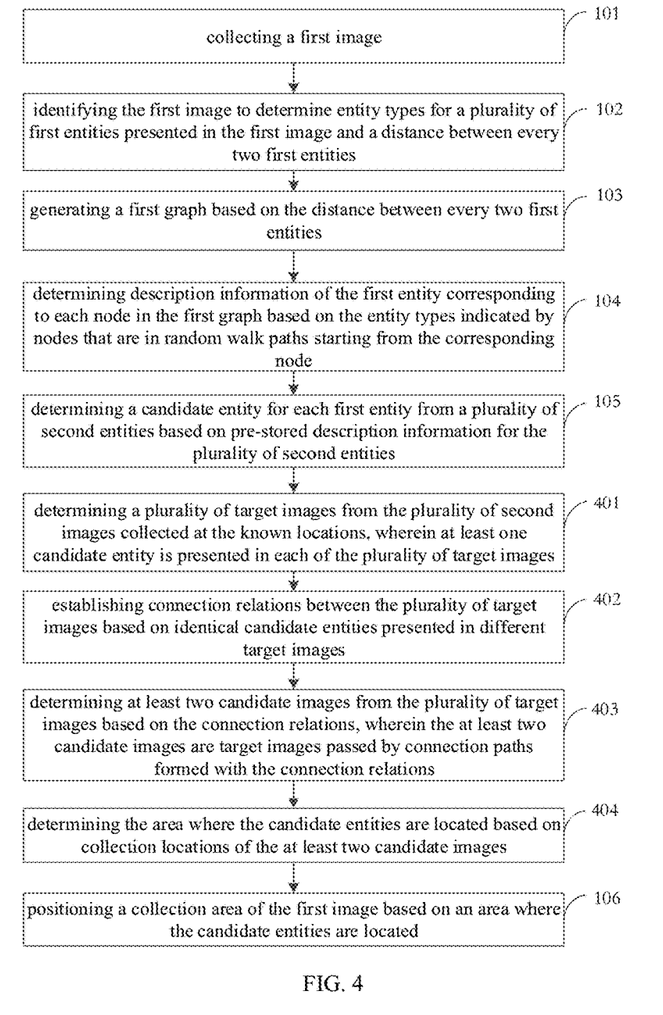
FIG. 4 is a schematic flowchart of another visual positioning method according to embodiments of the disclosure.

Based on the above embodiment, this embodiment provides another possible implementation of the visual positioning method, which illustrates further restriction in a feature space corresponding to a plurality of images to improve the robustness of positioning. FIG. 4 is a schematic flowchart of another visual positioning method according to embodiments of the disclosure. As illustrated in FIG. 4, the following steps may be included before step 106.

At block 401, a plurality of target images are determined from the plurality of second images collected at the known locations, and at least one candidate entity is presented in each of the plurality of target images.

In particular, according to the determined candidate entities, a second image that has at least one candidate entity is selected from the plurality of second images as the target image. The plurality of target images may be multiple-frame target images, since the collection location of the second image is known, the collection location of the multi-frame target images determined from the second image is also known.

At block 402, connection relations between the plurality of target images are established based on identical candidate entities presented in different target images.

In particular, in case that a number of identical candidate entities presented in two target images from the plurality of target images is greater than a threshold number, connection relations between the two target images is established to realize the constraints between different images. That is, the constraints between different feature spaces is established.

At block 403, at least two candidate images are determined from the plurality of target images based on the connection relations, and the at least two candidate images are target images passed by connection paths formed with the connection relations.

It should be noted that the candidate image is a target image passed by connection paths formed with the connection relations. A number of the connection path passing through the target image may be one or more, that is, as long as there is one connection path passing through the target image, the target image is the candidate image.

At block 404, the area where the candidate entities are located is determined based on collection locations of the at least two candidate images.

In particular, a largest connection area containing the collection locations of the at least two candidate images is determined as the area where the candidate entities are located. That is, the largest connection area is obtained by connecting the determined collection locations of the at least two candidate images, i.e., the smallest area that contains at least two candidate images. For example, if the determined collection locations of 4 candidate images are a, b, d, and h respectively in FIG. 5, the illustrated area (i.e., the largest connection area) containing the collection locations of 4 candidate images is determined as the area where the candidate entities are located, which achieves rough positioning of the area where the candidate entities are located, and the collection area of the first image that needs to be located is further positioned according to the area where the candidate entities are located.

Figure 5:
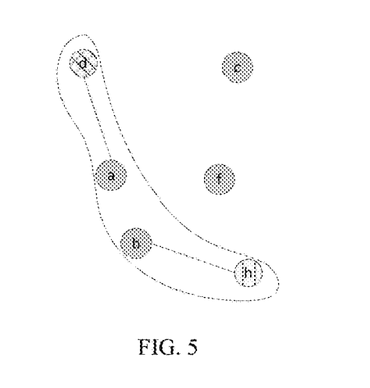
FIG. 5 is a schematic diagram of a candidate area according to embodiments of the disclosure.

It should be noted that the largest connection area and its appearance in FIG. 5 are only schematic representations, and do not constitute a limitation on the largest connection area of this embodiment.

In the visual positioning method according to the embodiments, a plurality of target images are determined from the plurality of second images collected at the known locations, and at least one candidate entity is presented in each of the plurality of target images. Connection relations between the plurality of target images are established based on identical candidate entities presented in different target images. At least two candidate images are determined from the plurality of target images based on the connection relations, and the at least two candidate images are target images passed by connection paths formed with the connection relations. The largest connection area containing the collection locations of at least two candidate images is determined as the area where the candidate entities are located. By establishing the connection relations between the images collected at different locations, further restrictions on the positioning results in a feature space corresponding to different images is realized to improve robustness and stability of visual positioning system.

Figure 6:
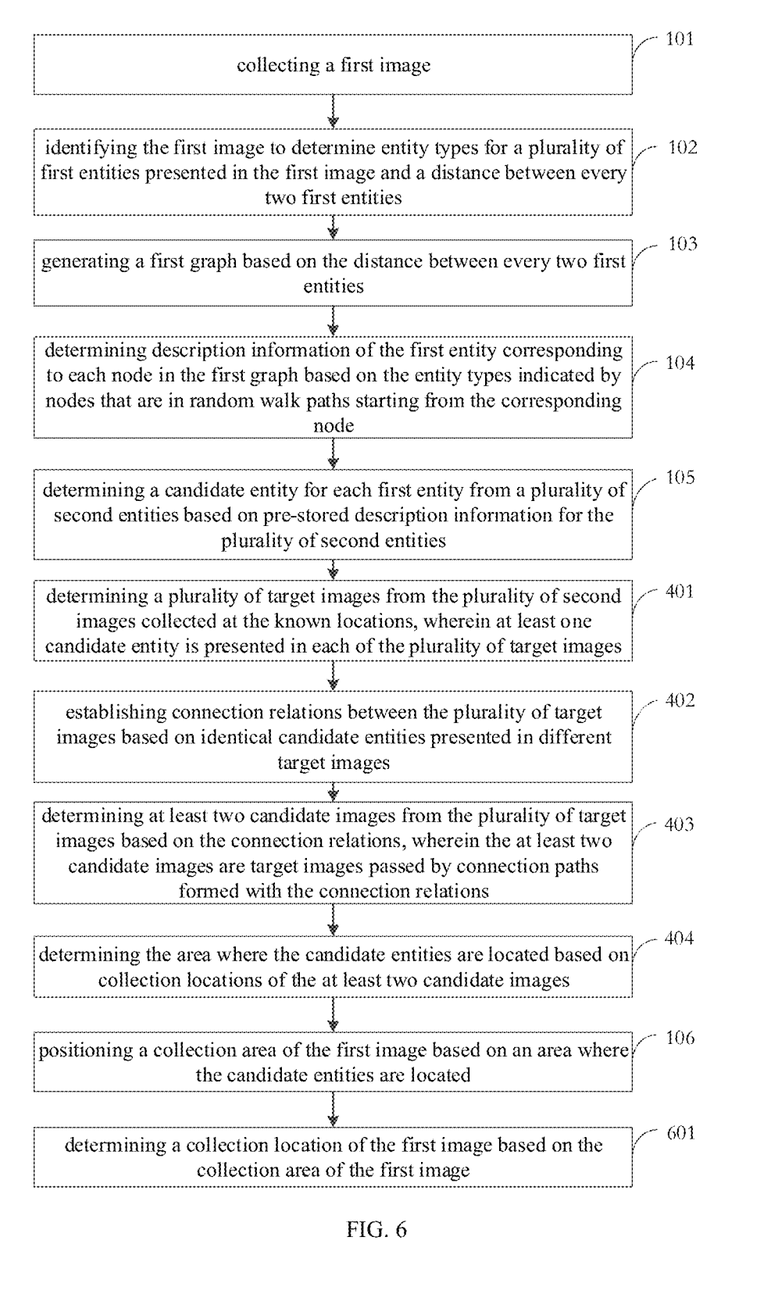
FIG. 6 is a schematic flowchart of another visual positioning method according to embodiments of the disclosure.

Based on the above embodiments, this embodiment provides a possible implementation of a visual positioning method, which illustrates after the collection area of the first image is determined, the collection location of the first image is accurately positioned in the collection area. FIG. 6 is a schematic flowchart of another visual positioning method according to embodiments of the disclosure. As illustrated in FIG. 6, after positioning the collection area of the first image, the following steps may be further included.

At block 601, the collection location of the first image is determined based on the collection area of the candidate image.

Since a number of the determined candidate entities is more than one, as a possible implementation, a candidate image presented with a largest number of candidate entities is determined from at least two candidate images, and a collection location of the candidate image presented with the largest number of candidate entities is queried as the collection location of the first image. The accurate positioning of the collection location of the first image is achieved in the determined collection area, which is applicable to image retrieval scenarios.

As another possible implementation, a center of the two collection locations of the at least two candidate images is determined as a collection location of the first image. In particular, a location coordinate for the collection location of each candidate image is determined, and a location coordinate of the center is determined as the collection location of the first image based on an average value of the location coordinates of respective collection locations. The further positioning of the collection position of the first image is thus achieved in the determined collection area.

As yet another possible implementation, a location coordinate for the collection location of each candidate image is determined, a weighted calculation on the collection locations of respective candidate images is performed, and the calculated location coordinate is determined as the collection location of the first image. The accurate positioning of the collection location of the first image is thus achieved in the determined collection area, so as to meet positioning requirements of the specific scenarios.

In the visual positioning method of the embodiment of the disclosure, the collection location of the first image is further determined in the determined collection area of the first image. The further positioning of the collection location of the first image is thus achieved in the determined collection area, so as to meet positioning accuracy requirements of the specific scenarios.

Figure 7:
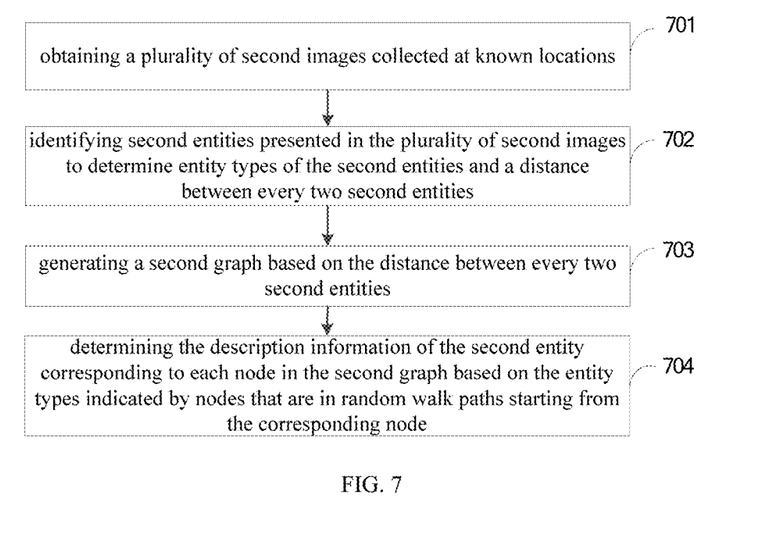
FIG. 7 is a schematic flowchart of yet another visual positioning method according to embodiments of the disclosure.

Based on the above embodiments, this embodiment provides yet another possible implementation of the visual positioning method, which specifically describes how to obtain the pre-stored description information of the second entities. FIG. 7 is a schematic flowchart of yet another visual positioning method according to embodiments of the disclosure.

As illustrated in FIG. 7, before step 105, the method further includes the following steps.

At block 701, a plurality of second images collected at known locations are obtained.

The plurality of second images are collected at known locations, and may be shot via a camera terminal by continuously changing to different locations. Shooting times and locations of each frame are recorded during shooting process, and the location of each second entity in the plurality of second images is thus determined based on the known locations.

At block 702, second entities presented in the plurality of second images are identified to determine entity types of the second entities and a distance between every two second entities.

In particular, the second entities presented in the plurality of second images are sequentially identified to obtain the entity types of the plurality of second entities contained in each second image. Meanwhile, the distance between every two second entities needs to be determined. Since there may be a plurality of second images that need to be visually positioned, a plurality of second entities are identified after performing semantic segmentation on each of the plurality of second images, in which every two second entities may be presented in an identical second image or in two different second images. Therefore, the following two scenarios need to be distinguished when determining the distance between every two second entities.

In case that two second entities are presented in the identical second image, a distance between the two second entities is determined based on a distance between centers of two corresponding segmented image areas.

In case that two second entities are presented in two different second images, a distance between the two second entities is determined based on a distance between collection locations of the two different second images.

It should be noted that the distances in this embodiment are all distances in physical world coordinate system.

At block 703, a second graph is generated based on the distance between every two second entities.

The second graph includes nodes corresponding to the plurality of second entities and edges for connecting different nodes in the second graph, the node corresponding to the second entity is configured to indicate the entity type for the second entity, and the edge in the second graph is configured to indicate that a distance between two second entities corresponding to two connected nodes is less than a threshold distance.

Figure 8:
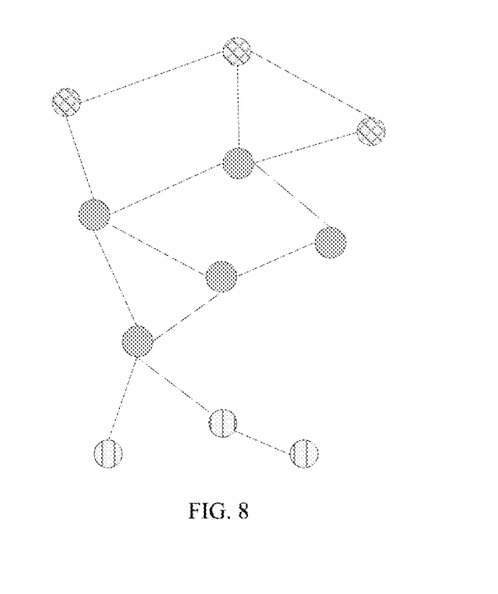
FIG. 8 is a first schematic diagram of a second graph according to the disclosure.

FIG. 8 is a first schematic diagram of a second graph according to the disclosure. As illustrated in FIG. 8, the second graph is generated when a number of the collected second images are three. As illustrated in FIG. 8, the nodes corresponding to different forms of solid balls represent different second images. For example, grid solid balls represent an identical second image, and gray solid balls represent another identical second image, which is not listed here. Meanwhile, the distance between the second nodes is less than a threshold value. Since each second entity and the distance between every two second entities in different second images are identified in the previous step, the two second entities with a distance less than a threshold distance are connected by edges. When the distance between two second entities is less than the threshold distance, that is, the distance between the two second entities is small, the other second entity that is close to one of the two second entities may be observed when collecting the second entity. In other words, the second image collected includes two entities that are close to each other, which means that the two second entities are semantically correlated. The correlation relation between the two second entities is represented through the semantic graph, so as to reflect the semantic constraint relation between the entities in different images.

At block 704, the description information of the second entity corresponding to each node in the second graph is determined based on the entity types indicated by nodes that are in random walk paths starting from the corresponding node.

Figure 9:
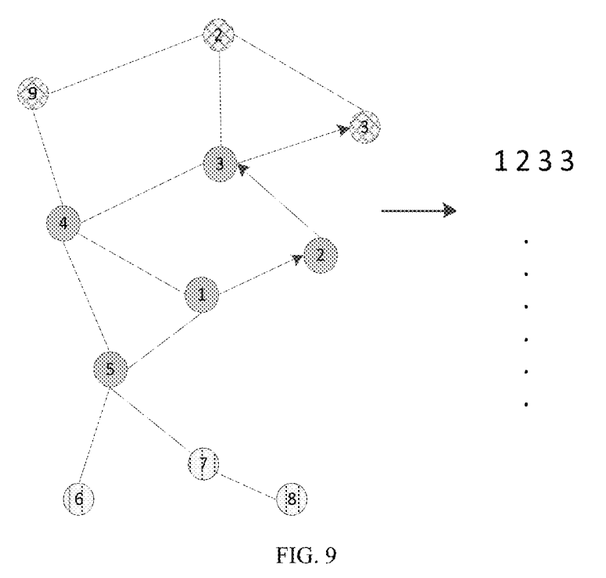
FIG. 9 is a second schematic diagram of the second graph according to the disclosure.

FIG. 9 is a second schematic diagram of the second graph according to the disclosure. As illustrated in FIG. 9, different entity types are numbered with different numbers. For example, the entity types are numbered with numbers 1-N in a sequential order, where N is a natural number. Furthermore, the node corresponding to each first entity is represented by the number corresponding to the entity type. For example, the node 1 indicates that the entity type number corresponding to the node is 1. As illustrated in FIG. 9, taking the second entity corresponding to the node 1 as an example, the entity type indicated by each node in the path 1 represented with arrows is walked starting from the node 1 with the random walk algorithm, and four dimensions of representation (1, 2, 3, 3) are obtained. The node 1 is a starting point, and other paths may also be walked to obtain four dimensions of representation (1, 4, 3, 3) or four dimensions of representation (1, 5, 7, 8), which is not listed in this embodiment. Therefore, based on the path corresponding to each node, the description information of the second entity corresponding to each node is expressed as N*M, where N is the path corresponding to each node, and M is a number of nodes included in each path, that is, a dimension of the entity type. The description information of the second entity is obtained by walking through the entity type indicated by each node in the random walk path, so that the description information (i.e., the semantic type) of each second entity corresponding to one node not only contains the semantic information of the second entity corresponding to this node, but also contains the semantic constraint information between the second entity corresponding to this node and the second entities corresponding to other different nodes, which improves accuracy and robustness of positioning.

It should be noted that when there are more than 3 second images to be positioned, the method for determining the graph is the same as the method when there are 3 second images. Meanwhile, the method for determine the description information of each entity with the random walk algorithm is the same as the method for determining the description information of each entity in the corresponding graph in FIG. 9, which is not repeated herein.

It should be noted that, in a second graph that is generated in advance from a plurality of second images, the plurality of second images along with the connection relations between the second images are included, a semantic graph (that is, the second graph) consisted of entities in the plurality of second images at known collection locations is generated. The description information of each entity node constructed with the random walk algorithm not only contains the semantic information of the corresponding node, but also contains the local constraint information between semantics of entities in different images, which improves the robustness, accuracy and stability of the visual positioning for the collected images.

In the visual positioning method of the embodiments, the plurality of second images are taken at known locations. Through semantic identification of the second images, a plurality of second entities in each second image are identified. The area where each second entity in the plurality of second images is located is determined based on the known locations, and the second graph corresponding to the second images is obtained. According to the second graph, the random walk algorithm is used to determine the description information of each second entity. Therefore, it is possible to pre-establish databases containing description information for the plurality of second entities for the second entities. Therefore, when the first image needs to be positioned, the determined description information for the corresponding entity in the first image is matched with the pre-stored description information for the plurality of second entities, and the matched candidate entity is determined from the plurality of second entities. According to the area where the candidate entity is located, the collection area of the first image is positioned, which improves the robustness, accuracy and stability of the visual positioning for the collected images.

Figure 10:
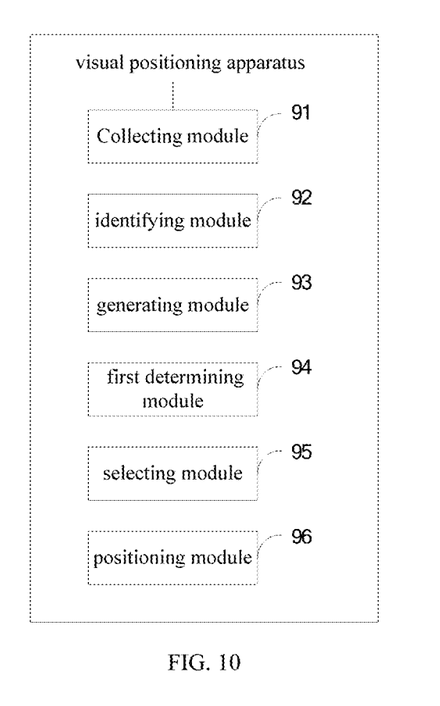
FIG. 10 is a structural schematic diagram of a visual positioning apparatus according to embodiments of the disclosure.

To realize the above embodiments, this disclosure provides a visual positioning apparatus. FIG. 10 is a structural schematic diagram of a visual positioning apparatus according to embodiments of the disclosure.

As illustrated in FIG. 10, the apparatus further includes: a collecting module 91, an identifying module 92, a generating module 93, a first determining module 94, a selecting module 95 and a positioning module 96.

The collecting module 91 is configured to collect a first image.

The identifying module 92 is configured to identify the first image to determine entity types for a plurality of first entities presented in the first image and a distance between every two first entities.

The generating module 93 is configured to generate a first graph based on the distance between every two first entities, in which the first graph includes nodes corresponding to the plurality of first entities and edges for connecting different nodes in the first graph, the node is configured to indicate the entity type for the corresponding first entity, and the edge is configured to indicate that a distance between two first entities corresponding to two connected nodes is less than a threshold distance.

The first determining module 94 is configured to determine description information of the first entity corresponding to each node in the first graph based on the entity types indicated by nodes that are in random walk paths starting from the corresponding node.

The selecting module 95 is configured to determine a candidate entity for each first entity from a plurality of second entities based on pre-stored description information for the plurality of second entities, in which the description information of the candidate entity for the first entity matches the description information of the first entity, the description information of each second entity is configured to indicate entity types for second entities adjacent to the corresponding second entity.

The positioning module 96 is configured to position a collection area of the first image based on an area where the candidate entities are located.

In a possible implementation of the embodiments of the disclosure, the apparatus further includes: an obtaining module, a second determining module, an establishing module, a first location determining module and a second location determining module.

As a possible implementation, before positioning by the positioning module 96 the collection area of the first image, the second determining module is configured to determine a plurality of target images from the plurality of second images collected at the known locations, in which at least one candidate entity is presented in each of the plurality of target images. The establishing module is configured to establish connection relations between the plurality of target images based on identical candidate entities presented in different target images.

The second determining module is further configured to determine at least two candidate images from the plurality of target images based on the connection relations, in which the at least two candidate images are target images passed by connection paths formed with the connection relations, and determine the area where the candidate entities are located based on collection locations of the at least two candidate images.

The obtaining module is configured to obtain a plurality of second images collected at known locations.

As a possible implementation, the first location determining module is configured to determine a candidate image presented with a largest number of candidate entities from the at least two candidate images, and query a collection location of the candidate image presented with the largest number of candidate entities as the collection location of the first image.

As another possible implementation, the second location determining module is configured to determine a center of the two collection locations of the at least two candidate images as a collection location of the first image.

Optionally, the second location determining module is configured to determine location coordinates of the collection locations of respective candidate images, and determine a location coordinate of the center based on an average value of the location coordinates of the collection locations.

As a possible implementation, before obtaining by the above selecting module a matched candidate entity, the obtaining module is configured to obtain a plurality of second images collected at known locations.

The identifying module 92 is configured to identify second entities presented in the plurality of second images to determine entity types of the second entities and a distance between every two second entities.

The generating module 93 is configured to generate a second graph based on the distance between every two second entities, in which the second graph includes nodes corresponding to the plurality of second entities and edges for connecting different nodes in the second graph, the node corresponding to the second entity is configured to indicate the entity type for the second entity, and the edge in the second graph is configured to indicate that a distance between two second entities corresponding to two connected nodes is less than a threshold distance.

The first determining module 94 is configured to determine the description information of the second entity corresponding to each node in the second graph based on the entity types indicated by nodes that are in random walk paths starting from the corresponding node.

As another possible implementation, the identifying module 92 is configured to: perform semantic segmentation on each of the plurality of second images to determine the entity type for the second entity presented in each segmented image area; in case that two second entities are presented in an identical second image, determine a distance between the two second entities based on a distance between centers of two corresponding segmented image areas; and in case that two second entities are presented in two different second images, determine a distance between the two second entities based on a distance between collection locations of the two different second images.

It should be noted that the explanation of embodiments of the visual positioning method is applicable to the visual positioning apparatus according to the embodiments due to the same principle, which is not repeated herein.

With the visual positioning apparatus, a first image is collected, the first image is identified to determine entity types for a plurality of first entities presented in the first image and a distance between every two first entities. A first graph is generated based on the distance between every two first entities. Description information of the first entity corresponding to each node in the first graph is determined based on the entity types indicated by nodes that are in random walk paths starting from the corresponding node. A candidate entity for each first entity is determined from a plurality of second entities based on pre-stored description information for the plurality of second entities. A collection area of the first image is positioned based on an area where the candidate entities are located. The description information of each entity node is constructed based on the generated semantic graph with the random walk algorithm, so that the description information not only contains the semantic information of the corresponding node, but also local constraint information between semantics, which improves robustness, accuracy and stability of visual positioning for the collected images.

In order to implement the above embodiments, the disclosure provides an electronic device including a memory, a processor, and computer programs stored on the memory and capable of running on the processor, when the processor executes the computer programs, the method according to the above embodiments is implemented.

In order to implement the above embodiments, the disclosure provides a non-transitory computer-readable storage medium having computer programs stored thereon, when the programs are executed by a processor, the method according to the above embodiments is implemented.

According to the embodiments of the disclosure, the disclosure also provides an electronic device and a readable storage medium.

Figure 11:
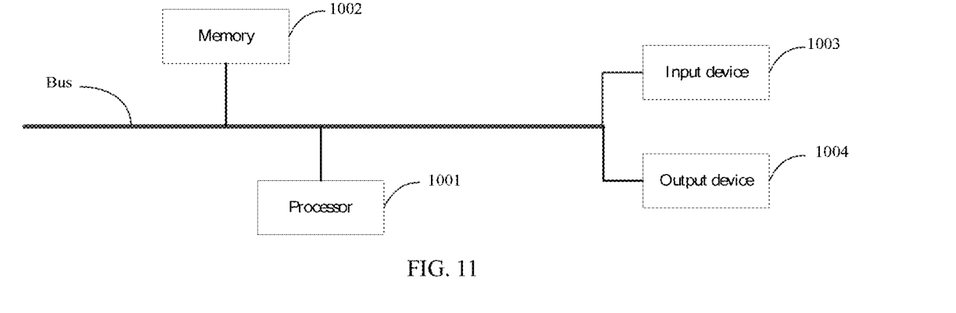
FIG. 11 is a block diagram of an electronic device used to implement a visual positioning method according to embodiments of the disclosure.

FIG. 11 is a block diagram of an electronic device used to implement the visual positioning method according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 11, the electronic device includes: one or more processors 1001, a memory 1002, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 1001 is taken as an example in FIG. 11.

The memory 1002 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 1002 is configured to store non-transitory software programs, non-transitory computer executable programs and modules, such as program instructions/modules (for example, the collecting module 91, the identifying module 92, the generating module 93, the first determining module 94, the selecting module 95, and the positioning module 96 shown in FIG. 10) corresponding to the method in the embodiment of the disclosure. The processor 1001 executes various functional applications and data processing of the server by running non-transitory software programs, instructions, and modules stored in the memory 1002, that is, implementing the method in the foregoing method embodiments.

The memory 1002 may include a storage program area and a storage data area, where the storage program area may store an operating system and application programs required for at least one function. The storage data area may store data created according to the use of the electronic device for implementing the method. In addition, the memory 1002 may include a high-speed random access memory, and a non-transitory memory, such as at least one magnetic disk storage device, a flash memory device, or other non-transitory solid-state storage device. In some embodiments, the memory 1002 may optionally include a memory remotely disposed with respect to the processor 1001, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 1003 and an output device 1004. The processor 1001, the memory 1002, the input device 1003, and the output device 1004 may be connected through a bus or in other manners. In FIG. 11, the connection through the bus is taken as an example.

The input device 1003 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 1004 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the technical solution of the embodiments of the disclosure, a first image is collected, identification on the first image is performed to determine entity types for a plurality of first entities presented in the first image, and a distance between every two first entities is determined. A first graph is generated based on the distance between every two first entities, description information of the first entity corresponding to each node in the first graph is determined based on the entity types indicated by nodes that are in random walk paths starting from the corresponding node. A candidate entity for each first entity is determined from a plurality of second entities based on pre-stored description information for the plurality of second entities. A collection area of the first image is positioned based on an area where the candidate entities are located. The description information of each entity node is generated based on a semantic graph according to random walk algorithm, so that the description information not only contains the semantic information of the corresponding node, but also local constraint information between semantics, which improves robustness, accuracy and stability of visual positioning for the collected images.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A visual positioning method, comprising:
   collecting a first image;
   identifying the first image to determine entity types for a plurality of first entities presented in the first image and a distance between every two first entities;
   generating a first graph based on the distance between every two first entities, wherein the first graph comprises nodes corresponding to the plurality of first entities and edges for connecting different nodes in the first graph, the node is configured to indicate the entity type for the corresponding first entity, and the edge is configured to indicate that a distance between two first entities corresponding to two connected nodes is less than a threshold distance;
   determining description information of the first entity corresponding to each node in the first graph based on the entity types indicated by nodes that are in random walk paths starting from the corresponding node;
   determining a candidate entity for each first entity from a plurality of second entities based on pre-stored description information for the plurality of second entities, wherein the description information of the candidate entity for the first entity matches the description information of the first entity, the description information of each second entity is configured to indicate entity types for second entities adjacent to the corresponding second entity; and
   positioning a collection area of the first image based on an area where the candidate entities are located.

2. The method according to claim 1, before determining the candidate entity for each first entity from the plurality of second entities based on the pre-stored description information of the plurality of second entities, further comprising:
   obtaining a plurality of second images collected at known locations;
   identifying second entities presented in the plurality of second images to determine entity types of the second entities and a distance between every two second entities;
   generating a second graph based on the distance between every two second entities, wherein the second graph comprises nodes corresponding to the plurality of second entities and edges for connecting different nodes in the second graph, the node corresponding to the second entity is configured to indicate the entity type for the second entity, and the edge in the second graph is configured to indicate that a distance between two second entities corresponding to two connected nodes is less than a threshold distance; and
   determining the description information of the second entity corresponding to each node in the second graph based on the entity types indicated by nodes that are in random walk paths starting from the corresponding node.

3. The method according to claim 1, before positioning the collection area of the first image based on the area where the candidate entities are located, further comprising:
   determining a plurality of target images from the plurality of second images collected at the known locations, wherein at least one candidate entity is presented in each of the plurality of target images;
   establishing connection relations between the plurality of target images based on identical candidate entities presented in different target images;
   determining at least two candidate images from the plurality of target images based on the connection relations, wherein the at least two candidate images are target images passed by connection paths formed with the connection relations; and
   determining the area where the candidate entities are located based on collection locations of the at least two candidate images.

4. The method according to claim 3, wherein the establishing the connection relations between the plurality of target images based on the identical candidate entities presented in different target images comprises:
   establishing a connection relation between two target images, in case that a number of identical candidate entities presented in the two target images from the plurality of target images is greater than a threshold number.

5. The method according to claim 3, wherein the determining the area where the candidate entities are located based on the collection locations of the at least two candidate images, comprises:

determining a largest connection area containing the collection locations of the at least two candidate images as the area where the candidate entities are located.

6. The method according to claim 3, after positioning the collection area of the first image based on the area where the candidate entities are located, further comprising:
determining a candidate image presented with a largest number of candidate entities from the at least two candidate images; and
querying a collection location of the candidate image presented with the largest number of candidate entities as the collection location of the first image.

7. The method according to claim 3, after positioning the collection area of the first image based on the area where the candidate entities are located, further comprising:
determining a center of the two collection locations of the at least two candidate images as a collection location of the first image.

8. The method according to claim 7, wherein determining the center of the two collection locations of the at least two candidate images as the collection location of the first image, comprises:
determining location coordinates of the collection locations of respective candidate images; and
determining a location coordinate of the center based on an average value of the location coordinates of the collection locations.

9. The method according to claim 1, wherein the performing identification on the second entities presented in the plurality of second image to determine the entity types for the second entities and the distance between every two second entities, comprises:
performing semantic segmentation on each of the plurality of second images to determine the entity type for the second entity presented in each segmented image area;
in case that two second entities are presented in an identical second image, determining a distance between the two second entities based on a distance between centers of two corresponding segmented image areas; and
in case that two second entities are presented in two different second images, determining a distance between the two second entities based on a distance between collection locations of the two different second images.

10. A visual positioning apparatus, comprising:
at least one processor; and
a memory communicatively coupled to the at least one processor,
wherein the at least one processor is configured to:
collect a first image;
identify the first image to determine entity types for a plurality of first entities presented in the first image and a distance between every two first entities;
generate a first graph based on the distance between every two first entities, wherein the first graph comprises nodes corresponding to the plurality of first entities and edges for connecting different nodes in the first graph, the node is configured to indicate the entity type for the corresponding first entity, and the edge is configured to indicate that a distance between two first entities corresponding to two connected nodes is less than a threshold distance;
determine description information of the first entity corresponding to each node in the first graph based on the entity types indicated by nodes that are in random walk paths starting from the corresponding node;

determine a candidate entity for each first entity from a plurality of second entities based on pre-stored description information for the plurality of second entities, wherein the description information of the candidate entity for the first entity matches the description information of the first entity, the description information of each second entity is configured to indicate entity types for second entities adjacent to the corresponding second entity; and
position a collection area of the first image based on an area where the candidate entities are located.

11. The apparatus according to claim 10, wherein the at least one processor is further configured to:
obtain a plurality of second images collected at known locations;
identify second entities presented in the plurality of second images to determine entity types of the second entities and a distance between every two second entities;
generate a second graph based on the distance between every two second entities, wherein the second graph comprises nodes corresponding to the plurality of second entities and edges for connecting different nodes in the second graph, the node corresponding to the second entity is configured to indicate the entity type for the second entity, and the edge in the second graph is configured to indicate that a distance between two second entities corresponding to two connected nodes is less than a threshold distance; and
determine the description information of the second entity corresponding to each node in the second graph based on the entity types indicated by nodes that are in random walk paths starting from the corresponding node.

12. The apparatus according to claim 10, wherein the at least one processor is further configured to determine a plurality of target images from the plurality of second images collected at the known locations, wherein at least one candidate entity is presented in each of the plurality of target images;
establish connection relations between the plurality of target images based on identical candidate entities presented in different target images;
determine at least two candidate images from the plurality of target images based on the connection relations, wherein the at least two candidate images are target images passed by connection paths formed with the connection relations; and
determine the area where the candidate entities are located based on collection locations of the at least two candidate images.

13. The apparatus according to claim 12, wherein the at least one processor is further configured to:
establish a connection relation between two target images, in response to that a number of identical candidate entities presented in the two target images from the plurality of target images is greater than a threshold number.

14. The apparatus according to claim 12, wherein the at least one processor is further configured to:
determine a largest connection area containing the collection locations of the at least two candidate images as the area where the candidate entities are located.

15. The apparatus according to claim 12, wherein the at least one processor is further configured to:

determine a candidate image presented with a largest number of candidate entities from the at least two candidate images; and query a collection location of the candidate image presented with the largest number of candidate entities as the collection location of the first image.

16. The apparatus according to claim 12, wherein the at least one processor is further configured to:

determine a center of the two collection locations of the at least two candidate images as a collection location of the first image.

17. The apparatus according to claim 16, wherein the at least one processor is further configured to:

determine location coordinates of the collection locations of respective candidate images; and determine a location coordinate of the center based on an average value of the location coordinates of the collection locations.

18. The apparatus according to claim 10, wherein the at least one processor is further configured to:

perform semantic segmentation on each of the plurality of second images to determine the entity type for the second entity presented in each segmented image area;

in case that two second entities are presented in an identical second image, determine a distance between the two second entities based on a distance between centers of two corresponding segmented image areas; and in case that two second entities are presented in two different second images, determine a distance between the two second entities based on a distance between collection locations of the two different second images.

19. A non-transitory computer-readable storage medium having computer programs stored thereon, wherein when the programs are executed by a processor, a visual positioning method is implemented, the method comprising:

collecting a first image;

identifying the first image to determine entity types for a plurality of first entities presented in the first image and a distance between every two first entities;

generating a first graph based on the distance between every two first entities, wherein the first graph comprises nodes corresponding to the plurality of first entities and edges for connecting different nodes in the first graph, the node is configured to indicate the entity type for the corresponding first entity, and the edge is configured to indicate that a distance between two first entities corresponding to two connected nodes is less than a threshold distance;

determining description information of the first entity corresponding to each node in the first graph based on the entity types indicated by nodes that are in random walk paths starting from the corresponding node;

determining a candidate entity for each first entity from a plurality of second entities based on pre-stored description information for the plurality of second entities, wherein the description information of the candidate entity for the first entity matches the description information of the first entity, the description information of each second entity is configured to indicate entity types for second entities adjacent to the corresponding second entity; and positioning a collection area of the first image based on an area where the candidate entities are located.

* * * * *